United States Patent
Hirose

(10) Patent No.: US 10,865,135 B2
(45) Date of Patent: Dec. 15, 2020

(54) CERAMIC POWDER AND METHOD FOR PRODUCING SAME

(71) Applicant: Nippon Electric Glass Co., Ltd., Shiga (JP)

(72) Inventor: Masayuki Hirose, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 57 days.

(21) Appl. No.: 16/090,370

(22) PCT Filed: Mar. 22, 2017

(86) PCT No.: PCT/JP2017/011487
§ 371 (c)(1),
(2) Date: Oct. 1, 2018

(87) PCT Pub. No.: WO2017/170052
PCT Pub. Date: Oct. 5, 2017

(65) Prior Publication Data
US 2019/0112224 A1    Apr. 18, 2019

(30) Foreign Application Priority Data
Apr. 1, 2016    (JP) .................................. 2016-074249

(51) Int. Cl.
*C04B 35/19* (2006.01)
*C03C 8/24* (2006.01)
(Continued)

(52) U.S. Cl.
CPC .................. *C03C 8/24* (2013.01); *C03C 1/00* (2013.01); *C03C 3/145* (2013.01); *C03C 8/20* (2013.01);
(Continued)

(58) Field of Classification Search
CPC .... C03C 8/24; C03C 8/20; C03C 1/00; C03C 2205/00; C04B 35/626; C04B 35/6261;
(Continued)

(56) References Cited

U.S. PATENT DOCUMENTS 6,521,556 B2 *   2/2003   Shindo ................ C03C 10/0027
                                                                501/4
8,030,589 B2 *  10/2011   Huber .................. B07C 5/3416
                                                                209/578
(Continued)

FOREIGN PATENT DOCUMENTS

JP          63-315536          12/1988
JP          8-59294            3/1996
(Continued)

OTHER PUBLICATIONS

International Preliminary Report on Patentability dated Oct. 2, 2018 in International Application No. PCT/JP2017/011487.
(Continued)

*Primary Examiner* — Noah S Wiese
(74) *Attorney, Agent, or Firm* — Wenderoth, Lind & Ponack, L.L.P.

(57) ABSTRACT

The present invention provides a ceramic powder, in which β-eucryptite or a β-quartz solid solution is precipitated as a main crystal phase, and which includes $TiO_2$ and/or $ZrO_2$.

12 Claims, 2 Drawing Sheets

(51) Int. Cl.
*C04B 35/626* (2006.01)
*C03C 8/20* (2006.01)
*C03C 1/00* (2006.01)
*C03C 3/145* (2006.01)
*C04B 35/64* (2006.01)

(52) U.S. Cl.
CPC ............ *C04B 35/19* (2013.01); *C04B 35/626* (2013.01); *C04B 35/6261* (2013.01); *C04B 35/6262* (2013.01); *C04B 35/64* (2013.01); *C03C 2205/00* (2013.01); *C04B 2235/3203* (2013.01); *C04B 2235/3232* (2013.01); *C04B 2235/3244* (2013.01); *C04B 2235/3472* (2013.01); *C04B 2235/656* (2013.01); *C04B 2235/85* (2013.01)

(58) Field of Classification Search
CPC ............ C04B 35/19; C04B 2235/3203; C04B 2235/3232; C04B 2235/3244; C04B 2235/3472; C04B 2235/85
See application file for complete search history.

(56) References Cited

U.S. PATENT DOCUMENTS

| 2002/0045527 A1 | 4/2002 | Shindo et al. |
| 2002/0058578 A1 | 5/2002 | Shindo |
| 2009/0155555 A1 | 6/2009 | Botelho et al. |

FOREIGN PATENT DOCUMENTS

| JP | 2001-172048 | 6/2001 | |
| JP | 2002-104841 | 4/2002 | |
| JP | 2006-124228 | 5/2006 | |
| JP | 2006124228 A * | 5/2006 | ............ C03C 3/084 |
| JP | 2007-91577 | 4/2007 | |
| JP | 2011-502947 | 1/2011 | |

OTHER PUBLICATIONS

International Search Report dated Jun. 13, 2017 in International Application No. PCT/JP/2017/011487.

* cited by examiner

BEFORE PULVERIZATION

AFTER PULVERIZATION

CERAMIC POWDER AND METHOD FOR PRODUCING SAME

TECHNICAL FIELD

The present invention relates to a ceramic powder and a method of producing the same, and more specifically, to a ceramic powder to be used by being mixed with a glass powder and a method of producing the same.

BACKGROUND ART

In general, a composite powder material including glass powder and ceramic powder is used as a sealing material. This sealing material is excellent in chemical durability and heat resistance and suitable for securing airtightness as compared to a resin-based adhesive.

For example, high-expansion and low-melting-point glass, such as PbO-based glass or $Bi_2O_3$-based glass, is used as the glass powder for sealing (see, for example, Patent Literatures 1 and 2).

In addition, the sealing material is used for sealing of a low-expansion substrate, such as an alumina substrate or a glass substrate. In this case, when the sealing material has an excessively high thermal expansion coefficient, there is a risk in that inappropriate residual strain is caused in a sealing layer or the low-expansion substrate after the sealing, and cracks occur in the sealing layer or the low-expansion substrate, resulting in hermetic leakage or the like. Therefore, when an object to be sealed has a low expansion coefficient, it is important to reduce the thermal expansion coefficient of the sealing material. In particular, when $Bi_2O_3$-based glass is used as the glass powder, a reduction in thermal expansion coefficient of the $Bi_2O_3$-based glass is naturally limited, and hence it is important to reduce the thermal expansion coefficient of the ceramic powder.

In view of the foregoing, when negative-expansion ceramic powder is used, the thermal expansion coefficient of the ceramic powder can be effectively reduced.

A lithium aluminosilicate-based (hereinafter referred to as "LAS-based") ceramic powder has been known as the negative-expansion ceramic powder. Moreover, the LAS-based ceramic powder expresses negative expansion through microcracks in a crystal grain boundary resulting from anisotropic expansion of crystal grains.

CITATION LIST

Patent Literature 1: JP 63-315536 A
Patent Literature 2: JP 08-59294 A

SUMMARY OF INVENTION

Technical Problem

Incidentally, the thickness of the sealing layer is designed depending on applications. In recent years, the thickness of the sealing layer has been designed to be small in some cases. For example, in the case of laser sealing (sealing through laser light irradiation), when the sealing layer has a small thickness, a laser sealing property can be remarkably enhanced. In addition, when the sealing layer has a small thickness, such sealing layer can contribute to reductions in height and size of a hermetic package.

In order to reduce the thickness of the sealing layer, the particle diameter of the ceramic powder in the sealing material needs to be reduced. However, when the particle diameter of the above-mentioned LAS-based ceramic powder is reduced, the number of microcracks in the crystal grain boundary is reduced, and the thermal expansion coefficient of the LAS-based ceramic powder is increased. As a result, the LAS-based ceramic powder does not sufficiently express negative expansion, and it becomes difficult to appropriately reduce the thermal expansion coefficient of the sealing material.

Thus, the present invention has been made in view of the above-mentioned circumstances, and a technical object of the present invention is to devise a LAS-based ceramic powder which has a low thermal expansion coefficient even when having a small particle diameter.

Solution to Problem

As a result of extensive efforts, the inventor of the present invention has found that the above-mentioned technical object can be achieved by solid solving $TiO_2$ and/or $ZrO_2$ in a LAS-based crystal. Thus, the finding is proposed as the present invention. That is, according to one embodiment of the present invention, there is provided a ceramic powder, in which β-eucryptite or a β-quartz solid solution is precipitated as a main crystal phase (crystal having the largest precipitation amount), and which comprises $TiO_2$ and/or $ZrO_2$.

Among LAS-based crystals ($Li_2O$—$Al_2O_3$-n$SiO_2$), the β-eucryptite ($Li_2O$—$Al_2O_3$-2$SiO_2$) and the β-quartz solid solution ($Li_2O$—$Al_2O_3$-n$SiO_2$: n>2), in which $SiO_2$ is additionally solid solved from the β-eucryptite, have negative expansion characteristics. Meanwhile, among the LAS-based crystals ($Li_2O$—$Al_2O_3$-n$SiO_2$), a crystal in which $SiO_2$ is solid solved until n exceeds around 4 is liable to transform into a β-spodumene solid solution, which has a positive thermal expansion coefficient. In view of the foregoing, in the ceramic powder according to the embodiment of the present invention, the β-eucryptite or the β-quartz solid solution, which has negative expansion characteristics, is precipitated as a main crystal phase.

In a related-art LAS-based ceramic powder, positive expansion in an a-axis direction is absorbed and negative expansion in a c-axis direction is reflected through microcracks present in a grain boundary between crystal grains, and thus the crystal grains exhibit negative volume expansion as a whole. The microcracks occur when strain is caused in the grain boundary between the crystal grains through anisotropic expansion of the crystal grains. Meanwhile, the microcracks do not occur when the crystal grains are reduced in size. Therefore, when the related-art LAS-based ceramic powder is applied to a sealing material, it is difficult to finely pulverize the related-art LAS-based ceramic powder.

In the ceramic powder according to the embodiment of the present invention, $TiO_2$ and/or $ZrO_2$ is solid solved in a main crystal. Therefore, the ceramic powder can maintain negative expansion characteristics even when having a small particle diameter. The reason why low expansion characteristics can be maintained even when the particle diameter is small by solid solving $TiO_2$ and/or $ZrO_7$ in a LAS-based crystal is not experimentally clarified. The inventor of the present invention presumes as described below. When $TiO_2$ and/or $ZrO_2$ is solid solved in the LAS-based crystal, strain is caused in a crystal grain structure, and the positive expansion in the a-axis direction is reduced. Thus, the crystal grains exhibit negative volume expansion. As a result, the negative expansion characteristics are maintained regardless of the presence or absence of the microcracks.

Secondly, it is preferred that the ceramic powder according to the embodiment of the present invention comprise, as a composition, in terms of mol %, 10% to 35% of $Li_2O$, 10% to 35% of $Al_2O_3$, 30% to 79.5% of $SiO_2$, and 0.005% to 5% of $TiO_2+ZrO_2$. With this, the positive-expansion β-spodumene solid solution is less liable to be precipitated, and hence the negative expansion characteristics are easily maintained. The content of "$TiO_2+ZrO_2$" refers to the total content of $TiO_2$ and $ZrO_2$.

Thirdly, it is preferred that the ceramic powder according to the embodiment of the present invention be substantially free of a glass phase. With this, the ceramic powder (particularly, $Li_2O$) is less liable to be dissolved in glass at the time of sealing, and hence a sealing material is less liable to be devitrified. In addition, the thermal expansion coefficient of the sealing material is easily maintained. The presence or absence of the glass phase may be determined with an X-ray diffractometer or the like.

When the ceramic powder is produced through a solid phase reaction, the ceramic powder substantially free of the glass phase can be obtained. Meanwhile, when the ceramic powder is produced by a melting method, the glass phase remains in the ceramic powder. The melting method is a method involving melting a raw material batch once to obtain a glass melt, followed by cooling and pulverizing the resultant melt, and subjecting the resultant to heat treatment as required, to thereby produce a ceramic powder.

Fourthly, it is preferred that the ceramic powder according to the embodiment of the present invention have a negative thermal expansion coefficient in a range of from 30° C. to 300° C. The "thermal expansion coefficient in a range of from 30° C. to 300° C." may be measured through push-rod type thermal expansion coefficient measurement (TMA). It is difficult to directly measure the thermal expansion coefficient of the ceramic powder, but when a fired body of a composite powder containing a glass powder and the ceramic powder at a predetermined volume ratio is used as a measurement sample and the thermal expansion coefficient of the fired body is measured, the thermal expansion coefficient of the ceramic powder alone can be determined by calculation.

Fifthly, a sealing material according to one embodiment of the present invention comprises a glass powder and a ceramic powder, wherein the ceramic powder preferably comprises the above-mentioned ceramic powder.

Sixthly, it is preferred that the sealing material according to the embodiment of the present invention be used for laser sealing.

Seventhly, a method of producing a ceramic powder according to one embodiment of the present invention comprises the steps of: firing a raw material batch to obtain, through a solid phase reaction, a sintered body in which β-eucryptite or a β-quartz solid solution is precipitated as a main crystal phase, and which comprises $TiO_2$ and/or $ZrO_2$; and pulverizing the sintered body to obtain a ceramic powder.

The method of producing a ceramic powder according to the embodiment of the present invention comprises the step of firing a raw material batch to obtain, through a solid phase reaction, a sintered body. When the sintered body is produced through the solid phase reaction, the glass phase does not remain in the sintered body. As a result, the ceramic powder (particularly, $Li_2O$) is less liable to be dissolved in glass at the time of sealing, and hence the sealing material is less liable to be devitrified. In addition, the thermal expansion coefficient of the sealing material is easily maintained.

Eighthly, it is preferred that the method of producing a ceramic powder according to the embodiment of the present invention comprise using a pulverized product of a pre-sintered body containing Li, Al, and Si as a whole or part of introduction raw materials for Li, Al, and Si. With this, a precipitated crystal can be homogenized, and variations in characteristics of the ceramic powder can be reduced.

Ninthly, it is preferred that the method of producing a ceramic powder according to the embodiment of the present invention comprise using any one of an oxide raw material, a hydroxide raw material, and a carbonate raw material as a whole or part of introduction raw materials for Li, Al, and Si.

Tenthly, it is preferred that in the method of producing a ceramic powder according to the embodiment of the present invention, the firing a raw material batch provides, through the solid phase reaction, a sintered body comprising as a composition, in terms of mol %, 10% to 35% of $Li_2O$, 10% to 35% of $Al_2O_3$, 30% to 79.5% of $SiO_2$, and 0.005% to 5% of $TiO_2+ZrO_2$.

Eleventhly, it is preferred that in the method of producing a ceramic powder according to the embodiment of the present invention, the firing a raw material batch be performed at from 1,000° C. to 1,450° C. With this, the LAS-based crystal can be appropriately precipitated without the glass phase remaining in the sintered body.

Twelfthly, it is preferred that in the method of producing a ceramic powder according to the embodiment of the present invention, the pulverizing the sintered body be performed so that the sintered body has a size smaller than a size of a precipitated crystal grain. With this, the particle diameter of the ceramic powder is reduced, and hence the ceramic powder can be suitably applied to a hermetic package including a sealing layer having a small thickness.

Thirteenthly, it is preferred that in the method of producing a ceramic powder according to the embodiment of the present invention, the pulverizing the sintered body be performed so that a grain boundary between precipitated crystal grains is substantially free of microcracks. With this, the particle diameter of the ceramic powder is reduced, and hence the ceramic powder can be suitably applied to the hermetic package including a sealing layer having a small thickness. When the ceramic powder has an average particle diameter $D_{50}$ of less than 10 μm, the grain boundary between the precipitated crystal grains is in a state of being substantially free of the microcracks.

DESCRIPTION OF EMBODIMENTS

Figure 1:
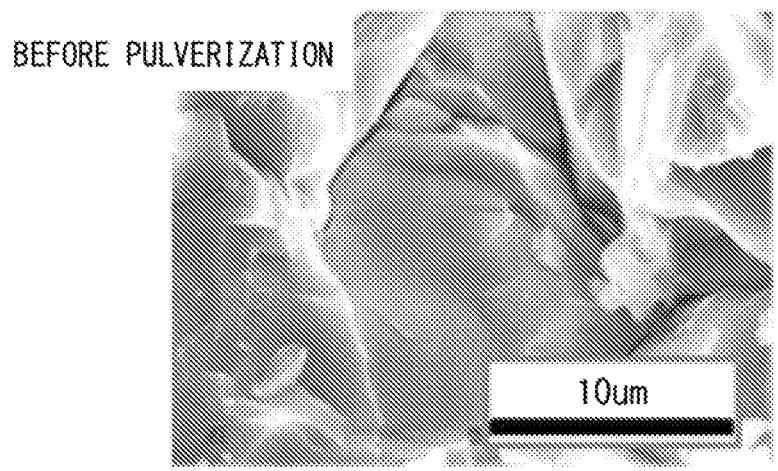
FIG. 1 is an electron micrograph of Sample No. 1 (before pulverization) shown in Table 2.

In a ceramic powder of the present invention, it is preferred that γ-eucryptite or a β-quartz solid solution be precipitated as a main crystal phase and no other crystal be precipitated, but as long as the effects of the present invention are not significantly impaired, the other crystal may be precipitated in a small amount.

The ceramic powder of the present invention comprises $TiO_2$ and/or $ZrO_2$. The content thereof in terms of a total content is preferably from 0.005 mol % to 5 mol %, particularly preferably from 0.1 mol % to 4 mol %. Also the individual content thereof is preferably from 0.005 mol % to 5 mol %, particularly preferably from 0.1 mol % to 4 mol %. When the content of $TiO_2$ and/or $ZrO_2$ is too small, the amount of solid solved $TiO_2$ and/or $ZrO_2$ in a LAS-based crystal is reduced. As a result, the ceramic powder is difficult to maintain negative expansion characteristics when reduced in particle diameter. Meanwhile, when the content of $TiO_2$ and/or $ZrO_2$ is too large, $TiO_2$ and/or $ZrO_2$ is not entirely solid solved in the LAS-based crystal, and $TiO_2$ and/or $ZrO_2$ is liable to remain as an oxide. As a result, the ceramic powder is difficult to maintain the negative expansion characteristics.

It is preferred that the ceramic powder of the present invention comprise, as a composition, in terms of mol %, 10% to 35% (preferably 16% to 30%) of $Li_2O$, 10% to 35% (preferably 16% to 30%) of $Al_2O_3$, 30% to 79.5% (preferably 40% to 70%) of $SiO_2$, and 0.005% to 5% (preferably 0.1% to 4%) of $TiO_2+ZrO_2$. When the composition of the ceramic powder deviates from the above-mentioned range, the precipitation of the β-eucryptite or the β-quartz solid solution as a main crystal phase becomes difficult. In addition, the ceramic powder is difficult to maintain the negative expansion characteristics when reduced in particle diameter. Any component other than the above-mentioned components, such as a sintering aid, may be introduced within a range of 10% or less.

The ceramic powder of the present invention has an average particle diameter $D_{50}$ of preferably 20 μm or less, 10 μm or less, 7 μm or less, or 5 μm or less, particularly preferably from 1 μm to 3 μm. As described above, the ceramic powder of the present invention can maintain the negative expansion characteristics even when having a small particle diameter. Therefore, the effects of the present invention are relatively increased as the particle diameter becomes smaller. The "average particle diameter $D_{50}$" refers to a value measured by laser diffractometry, and represents, in a cumulative particle size distribution curve on a volume basis measured by the laser diffractometry, a particle diameter at which the integration amount of particles from a smaller particle side is 50% in a cumulative manner.

The ceramic powder of the present invention has a maximum particle diameter $D_{max}$ of preferably 50 μm or less, 30 μm or less, 20 μm or less, or 15 μm or less, particularly preferably from 2 μm to 10 μm. As described above, the ceramic powder of the present invention can maintain the negative expansion characteristics even when having a small particle diameter. Therefore, the effects of the present invention are relatively increased as the particle diameter becomes smaller. The "maximum particle diameter $D_{max}$" refers to a value measured by the laser diffractometry, and represents, in the cumulative particle size distribution curve on a volume basis measured by the laser diffractometry, a particle diameter at which the integration amount of the particles from the smaller particle side is 99% in a cumulative manner.

The ceramic powder of the present invention preferably has a negative thermal expansion coefficient (less than $0 \times 10^{-7}/°C.$) in a range of from 30° C. to 300° C. The thermal expansion coefficient is preferably $-1 \times 10^{-7}/°C.$ or less, $-3 \times 10^{-7}/°C.$ or less, or $-6 \times 10^{-7}/°C.$ or less, particularly preferably $-20 \times 10^{-7}/°C.$ or more and $-9 \times 10^{-7}/°C.$ or less. When the thermal expansion coefficient in a range of from 30° C. to 300° C. is too high, it becomes difficult to sufficiently reduce the thermal expansion coefficient of a sealing material.

A sealing material of the present invention comprises a glass powder and a ceramic powder, and the ceramic powder is preferably the above-mentioned ceramic powder. The technical features of the sealing material of the present invention partially overlap the technical features of the ceramic powder of the present invention, and the detailed description of the overlapping portions is omitted.

In the sealing material of the present invention, the content of the ceramic powder is from 1 vol % to 45 vol %, preferably from 10 vol % to 45 vol % or from 15 vol % to 40 volt, particularly preferably from 20 vol % to 35 volt. When the content of the ceramic powder is too large, the content of the glass powder is relatively reduced, and hence it becomes difficult to ensure desired flowability and thermal stability. When the content of a refractory filler powder is too small, an effect exhibited by the addition of the refractory filler powder becomes poor.

A ceramic powder other than the ceramic powder of the present invention may be used as the ceramic powder. For example, one kind or two or more kinds selected from cordierite, zircon, alumina, mullite, willemite, zirconium phosphate, zirconium phosphate tungstate, and zircon tungstate may be included, but the content thereof is preferably from 0 vol % to 15 vol %, particularly preferably from 0 vol % to less than 10 vol % in terms of a total content.

In the sealing material of the present invention, any of various glass powders may be used as the glass powder. For example, $Bi_2O_3$-based glass, $V_2O_5$-based glass, or SnO-based glass is suitable in view of a low melting point characteristic, and $Bi_2O_3$-based glass is particularly preferred in view of thermal stability and water resistance. As used herein, the term "-based glass" refers to glass which comprises the specified components as essential components and in which the total content of the specified components is 25 mol % or more, preferably 30 mol % or more, more preferably 35 mol % or more. The glass composition of the glass powder is preferably substantially free of PbO (less than 0.1 mol %) from an environmental point of view.

The $Bi_2O_3$-based glass preferably comprises as a glass composition, in terms of mol %, 28% to 60% of $Bi_2O_3$, 15% to 37% of $B_2O_3$, and 1% to 30% of ZnO. The reasons why the content range of each component is limited as described above are described below. In the description of the glass composition range, the expression "%" means "mol %".

$Bi_2O_3$ is a main component for lowering a softening point, and its content is preferably from 28% to 60% or from 33% to 55%, particularly preferably from 35% to 45%. When the content of $Bi_2O_3$ is too small, the softening point becomes too high and hence flowability is liable to lower. Meanwhile, when the content of $Bi_2O_3$ is too large, the glass is liable to devitrify at the time of firing, and owing to the devitrification, the flowability is liable to lower.

$B_2O_3$ is an essential component as a glass-forming component, and its content is preferably from 15% to 37% or from 20% to 33%, particularly preferably from 25% to 30%. When the content of $B_2O_3$ is too small, a glass network is hardly formed, and hence the glass is liable to devitrify at the time of firing. Meanwhile, when the content of $B_2O_3$ is too large, the glass has an increased viscosity, and hence the flowability is liable to lower.

ZnO is a component which enhances devitrification resistance, and its content is preferably from 1% to 30%, from 3% to 25%, or from 5% to 22%, particularly preferably from 9% to 20%. When the content is less than 1%, or more than 30%, the glass composition loses its component balance, and hence the devitrification resistance is liable to lower.

In addition to the above-mentioned components, for example, the following components may be added.

$SiO_2$ is a component which enhances water resistance, while having an action of increasing the softening point. Accordingly, the content of $SiO_2$ is preferably from 0% to 5%, from 0% to 3%, or from 0% to 2%, particularly preferably from 0% to 1%. In addition, when the content of $SiO_2$ is too large, the glass is liable to devitrify at the time of firing.

$Al_2O_3$ is a component which enhances the water resistance. The content of $Al_2O_3$ is preferably from 0% to 10% or from 0% to 5%, particularly preferably from 0.1% to 2%. When the content of $Al_2O_3$ is too large, there is a risk in that the softening point is inappropriately increased.

$Li_2O$, $Na_2O$, and $K_2O$ are each a component which reduces the devitrification resistance. Therefore, the content of each of $Li_2O$, $Na_2O$, and $K_2O$ is from 0% to 5% or from 0% to 3%, particularly preferably from 0% to less than 1%.

MgO, CaO, SrO, and BaO are each a component which enhances the devitrification resistance, but are each a component which increases the softening point. Therefore, the content of each of MgO, CaO, SrO, and BaO is from 0% to 20% or from 0% to 10%, particularly preferably from 0% to 5%.

In order to lower the softening point of $Bi_2O_3$-based glass, it is required to introduce a large amount of $Bi_2O_3$ into the glass composition, but when the content of $Bi_2O_3$ is increased, the glass is liable to devitrify at the time of firing, and owing to the devitrification, the flowability is liable to lower. This tendency is particularly remarkable when the content of $Bi_2O_3$ is 30% or more. As a countermeasure for this problem, the addition of CuO can effectively suppress the devitrification of the glass even when the content of $Bi_2O_3$ is 30% or more. Further, when CuO is added, laser absorption characteristics at the time of laser sealing can be enhanced. The content of CuO is preferably from 0% to 40%, from 5% to 35%, or from 10% to 30%, particularly preferably from 15% to 25%. When the content of CuO is too large, the glass composition loses its component balance, and hence the devitrification resistance is liable to lower to the worse.

$Fe_2O_3$ is a component which enhances the devitrification resistance and the laser absorption characteristics, and its content is preferably from 0% to 10% or from 0.1% to 5%, particularly preferably from 0.5% to 3%. When the content of $Fe_2O_3$ is too large, the glass composition loses its component balance, and hence the devitrification resistance is liable to lower to the worse.

$Sb_2O_3$ is a component which enhances the devitrification resistance, and its content is preferably from 0% to 5%, particularly preferably from 0% to 2%. When the content of $Sb_2O_3$ is too large, the glass composition loses its component balance, and hence the devitrification resistance is liable to lower to the worse.

The glass powder preferably has an average particle diameter $D_{50}$ of less than 15 μm or from 0.5 μm to 10 μm, particularly preferably from 1 μm to 5 μm. As the average particle diameter $D_{50}$ of the glass powder is smaller, the softening point of the glass powder lowers.

Any powder material other than the glass powder and the ceramic powder may be introduced in the sealing material of the present invention. For example, in order to enhance the laser absorption characteristics, a laser absorbent, such as a Mn—Fe—Al-based oxide, carbon, or a Mn—Fe—Cr-based oxide, may be included at from 1 vol % to 15 vol %. In addition, glass beads, a spacer, or the like may be introduced.

The sealing material of the present invention may be used in a powdery state, but is preferably formed into a paste by being uniformly kneaded with a vehicle from the viewpoint of improving handleability. The vehicle generally comprises a solvent and a resin. The resin is added for the purpose of adjusting the viscosity of the paste. In addition, a surfactant, a thickener, or the like may also be added thereto as required. The produced paste is applied onto a surface of an object to be sealed by means of a coating machine, such as a dispenser or a screen printing machine.

As the resin, there may be used an acrylic acid ester (acrylic resin), ethylcellulose, a polyethylene glycol derivative, nitrocellulose, polymethylstyrene, polyethylene carbonate, a methacrylic acid ester, and the like. In particular, an acrylic acid ester and nitrocellulose are preferred because of good thermolytic property.

As the solvent, there may be used N,N'-dimethyl formamide (DMF), α-terpineol, a higher alcohol, γ-butyrolactone (γ-BL), tetralin, butylcarbitol acetate, ethyl acetate, isoamyl acetate, diethylene glycolmonoethyl ether, diethylene glycol monoethylether acetate, benzyl alcohol, toluene, 3-methoxy-3-methylbutanol, water, triethylene glycol monomethyl ether, triethylene glycol dimethyl ether, dipropylene glycol monomethyl ether, dipropylene glycol monobutyl ether, tripropylene glycol monomethyl ether, tripropylene glycol monobutyl ether, propylene carbonate, dimethyl sulfoxide (DMSO), N-methyl-2-pyrrolidone, and the like. In particular, α-terpineol is preferred because of high viscosity and good solubility of a resin and the like.

A method of producing a ceramic powder of the present invention comprises the steps of: firing a raw material batch to obtain, through a solid phase reaction, a sintered body in which β-eucryptite or a β-quartz solid solution is precipitated as a main crystal phase, and which comprises $TiO_2$ and/or $ZrO_2$; and pulverizing the sintered body to obtain a ceramic powder. The technical features of the method of producing a ceramic powder of the present invention partially overlap the technical features of the ceramic powder and the sealing material of the present invention, and the detailed description of the overlapping portions is omitted.

Various raw materials may be used as introduction raw materials for Li, Al, and Si. Of those materials, a pulverized product of a pre-sintered body containing Li, Al, and Si is preferably used. When the whole or part of the introduction raw materials are pre-sintered, a precipitated crystal can be homogenized, and variations in characteristics of the ceramic powder can be reduced. In addition, other than the pulverized product of a pre-sintered body containing Li, Al, and Si, an oxide raw material, a hydroxide raw material, a carbonate raw material, or the like may be used.

Various raw materials may be used as introduction raw materials for Ti and Zr. For example, a pulverized product of a pre-sintered body containing Ti and Zr, an oxide raw material, a hydroxide raw material, or a carbonate raw material may be used.

The firing of the raw material batch may be performed with an electric furnace, a gas furnace, or the like. A firing temperature of the raw material batch is preferably from 1,000° C. to 1,450° C., particularly preferably from 1,250° C. to 1,400° C. When the firing temperature is too low, the amount of the precipitated crystal in the ceramic powder is liable to be reduced. Meanwhile, when the firing temperature is too high, part of the sintered body is vitrified, and a glass phase is liable to remain in the sintered body. In addition, the degree of sintering of the sintered body is increased, and hence it becomes difficult to pulverize the sintered body. A firing time period of the raw material batch is preferably from 15 hours to 40 hours. When the firing time period is too short, the amount of the precipitated crystal in the ceramic powder is liable to be reduced. Meanwhile, when the firing time period is too long, the degree of sintering of the sintered body is increased, and hence it becomes difficult to pulverize the sintered body.

The raw material batch is preferably wet pulverized and mixed with a ball mill or the like. With this, the homogeneity of the raw material batch is improved, and hence the solid phase reaction can be promoted.

The pulverization of the sintered body may be performed with a ball mill, a jaw crusher, a jet mill, a disc mill, a spectro mill, a grinder, a mixer mill, or the like, but from the viewpoints of running cost and pulverization efficiency, dry or wet pulverization with a ball mill is preferred. A pulverized particle size of the sintered body is preferably smaller than the size of a precipitated crystal grain. In addition, the pulverized particle size of the sintered body is preferably adjusted to the extent that a grain boundary between the crystal grains is substantially free of microcracks. With this, the particle diameter of the ceramic powder is reduced, and hence the ceramic powder can be suitably applied to a hermetic package including a sealing layer having a small thickness.

After the pulverization of the sintered body, the particle diameter of the sintered body is preferably controlled through sieve classification or air classification as required.

EXAMPLES

Now, the present invention is described in detail based on Examples. The following Examples are merely illustrative. The present invention is by no means limited to the following Examples.

(Production of Pulverized Product of Pre-Sintered Body)

Raw materials shown in Table 1 were loaded into a pot made of alumina having an inner volume of 3.6 L and wet pulverized and mixed with each other for 12 hours. Thus, a raw material batch was produced. In the pulverization and mixing, 3,000 g of zirconia balls of φ3.0 mm were used as pulverization balls, and 800 ml of an alcohol was used as a dispersion medium.

TABLE 1

| (Mass %) | A | B |
|---|---|---|
| Aluminum hydroxide | 44 | 33 |
| Lithium carbonate | 23 | 17 |
| Silicon oxide | 33 | 50 |

Next, the raw material batch was dried, crushed, and retained at 800° C. for 8 hours and then fired at 1,335° C. for 16 hours in an electric furnace. A temperature increasing rate from room temperature to 800° C. was set to 5° C./min, a temperature increasing rate from 800° C. to 1,335° C. was set to 1° C./min, and a temperature decreasing rate from 1,335° C. was set to 1° C./min.

Further, the resultant sintered body was pulverized through dry pulverization and wet pulverization until the sintered body achieved an average particle diameter $D_{50}$ of 1.0 μm, and then classified with a 350-mesh test sieve. Thus, pulverized products A and B of pre-sintered bodies were produced.

(Production of Ceramic Powder)

A raw material batch shown in Table 2 was loaded into a pot made of alumina having an inner volume of 3.6 L and wet pulverized and mixed for 12 hours. In the pulverization and mixing, 3,000 g of zirconia balls of φ3.0 mm were used as pulverization balls, and 800 ml of an alcohol was used as a dispersion medium.

TABLE 2

| (Mass %) | No. 1 | No. 2 | No. 3 | No. 4 | No. 5 | No. 6 |
|---|---|---|---|---|---|---|
| Pre-sintered body A | 98 | 95 | 100 | 0 | 0 | 0 |
| Pre-sintered body B | 0 | 0 | 0 | 100 | 0 | 0 |
| Aluminum hydroxide | 0 | 0 | 0 | 0 | 44 | 33 |
| Lithium carbonate | 0 | 0 | 0 | 0 | 23 | 17 |
| Silicon oxide | 0 | 0 | 0 | 0 | 33 | 50 |
| Titanium oxide | 2 | 0 | 0 | 0 | 0 | 0 |
| Zirconium oxide | 0 | 2 | 0 | 0 | 0 | 0 |

Next, the raw material batch was dried, crushed, and retained at 800° C. for 8 hours and then fired at 1,335° C. for 16 hours in an electric furnace. A temperature increasing rate from room temperature to 800° C. was set to 5° C./min, a temperature increasing rate from 800'C to 1,335° C. was set to 1° C./min, and a temperature decreasing rate from 1,335° C. was set to 1° C./min.

Further, the resultant sintered body was pulverized through dry pulverization and wet pulverization until the sintered body achieved an average particle diameter $D_{50}$ of 1.0 μm, and then classified with a 350-mesh test sieve. Thus, each of Sample Nos. 1 to 6 was obtained. The compositions of Sample Nos. 1 to 6 are shown in Table 3. In each of Sample Nos. 1 and 2, a main crystal was β-eucryptite.

TABLE 3

| (Mol %) | No. 1 | No. 2 | No. 3 | No. 4 | No. 5 | No. 6 |
|---|---|---|---|---|---|---|
| $Li_2O$ | 25 | 25 | 25 | 17 | 25 | 17 |
| $Al_2O_3$ | 25 | 25 | 25 | 17 | 25 | 17 |
| $SiO_2$ | 49 | 49 | 50 | 66 | 50 | 66 |
| $TiO_2$ | 1 | 0 | 0 | 0 | 0 | 0 |
| $ZrO_2$ | 0 | 1 | 0 | 0 | 0 | 0 |
| α30-300 (×$10^{-7}$/° C.) | −12 | −6 | 0 | 2 | 3 | 6 |

(Production of $Bi_1O_3$-Based Glass Powder)

A glass batch was prepared by blending raw materials, such as various oxides and carbonates, so that a glass powder comprising as a glass composition, in terms of mol %, 38% of $Bi_2O_3$, 27% of $B_2O_3$, 5% of ZnO, 4% of BaO, 24.35% of CuO, 0.7% of $Fe_2O_3$, and 1% of $Al_2O_3$ was obtained. The prepared glass batch was loaded into a platinum crucible and melted at from 1,000° C. to 1,100° C. for 2 hours. Next, the resultant molten glass was formed into a thin sheet shape with a water-cooling roller. Finally, the glass in the thin sheet shape was pulverized with a ball mill, and then subjected to air classification. Thus, a $Bi_2O_3$-based glass powder was obtained. The $Bi_2O_3$-based glass powder had an average particle diameter D of 2.5 μm, a maximum particle diameter $D_{max}$ of 10 μm, and a thermal expansion coefficient in a range of from 30° C. to 300° C. of 104×$10^{-7}$/° C.

(Production of Sealing Material)

The $Bi_2O_3$-based glass powder described above and the ceramic powder shown in Table 3 were mixed at a volume ratio of 75:25. Thus, a sealing material was obtained.

The resultant sealing material was fired at 500° C. to provide a dense fired body. After that, a measurement sample for push-rod type thermal expansion coefficient measurement (TMA) was produced by processing the fired body into a predetermined shape. TMA was performed in a temperature range of from 30° C. to 300° C. through use of the measurement sample. The thermal expansion coefficient α of the ceramic powder shown in Table 3 was calculated based on the thermal expansion coefficient of the sealing material obtained.

Figure 2:
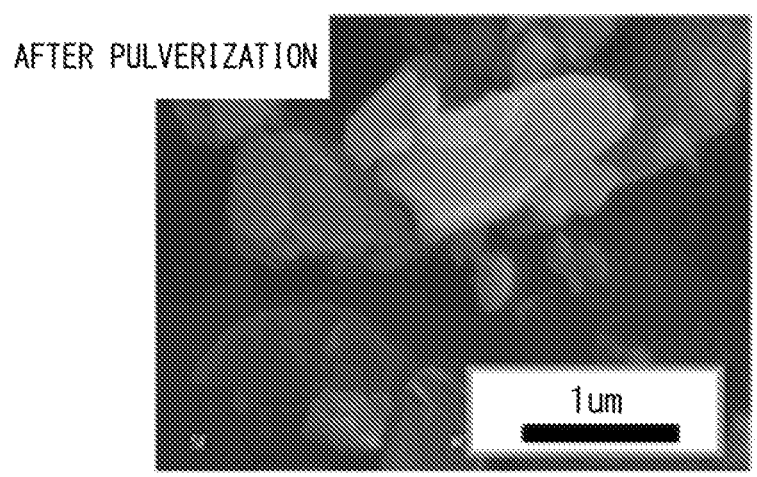
FIG. 2 is an electron micrograph of Sample No. 1 (after pulverization) shown in Table 2.
Figure 3:
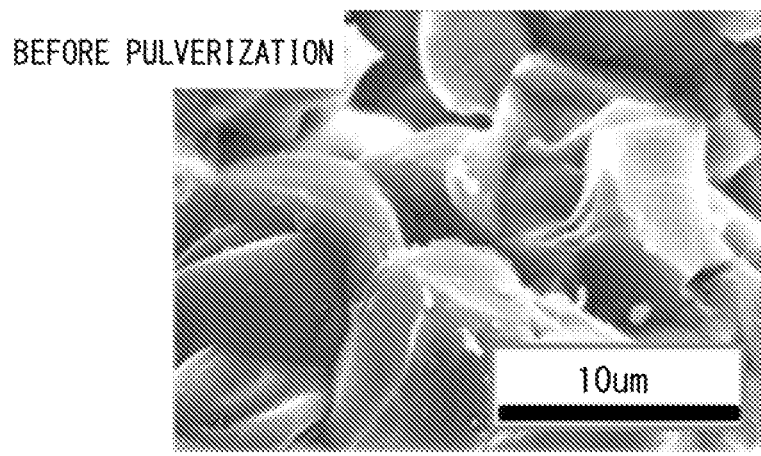
FIG. 3 is an electron micrograph of Sample No. 2 (before pulverization) shown in Table 2.
Figure 4:
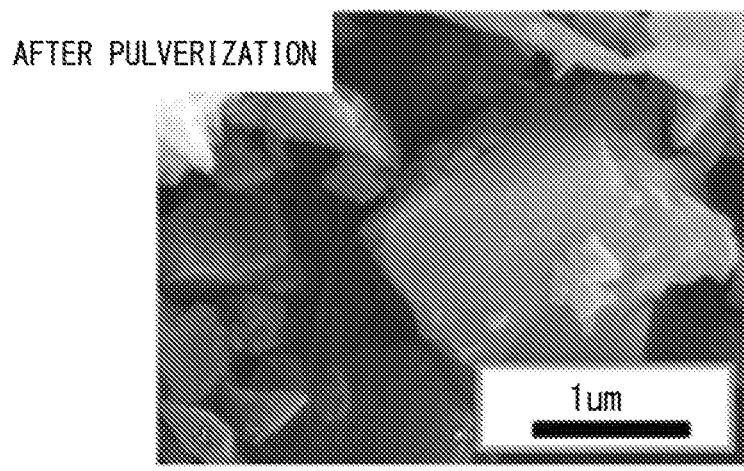
FIG. 4 is an electron micrograph of Sample No. 2 (after pulverization) shown in Table 2.

FIG. 1 is an electron micrograph of Sample No. 1 (before pulverization) shown in Tables 2 and 3. FIG. 2 is an electron micrograph of Sample No. 1 (after pulverization) shown in Tables 2 and 3. FIG. 3 is an electron micrograph of Sample No. 2 (before pulverization) shown in Tables 2 and 3. FIG. 4 is an electron micrograph of Sample No. 2 (after pulverization) shown in Tables 2 and 3. From FIGS. 1 to 4, it is revealed that each of Sample Nos. 1 and 2 has a crystal grain size of about 10 μm, and through the pulverization, the particle diameter of each of Sample Nos. 1 and 2 becomes smaller than the crystal grain size. Moreover, it is also revealed that, in each of Sample Nos. 1 and 2, a grain boundary between crystal grains is substantially free of microcracks.

As apparent from Table 3, each of Sample Nos. 1 and 2 exhibited negative expansion because of containing $TiO_2$ or $ZrO_2$ in its composition. Meanwhile, each of Sample Nos. 3 to 6 exhibited positive expansion because of not containing $TiO_2$ and $ZrO_2$ in its composition.

(Reference Example of Ceramic Powder Produced by Melting Method)

A raw material batch shown in Table 4 was loaded into a pot made of alumina having an inner volume of 3.6 L and wet pulverized and mixed for 12 hours. In the pulverization and mixing, 3,000 g of zirconia balls of φ3.0 mm were used as pulverization balls, and 800 ml of an alcohol was used as a dispersion medium.

TABLE 4

| (Mass %) | |
|---|---|
| Aluminum hydroxide | 44 |
| Lithium carbonate | 23 |
| Silicon oxide | 33 |

Next, the raw material batch was loaded into a platinum crucible and melted at 1,580° C. for 1 hour. After that, the resultant melt was poured between forming rollers (twin rollers) to cool and form the melt into a film shape. Subsequently, the resultant film was pulverized with a ball mill, classified with a 250-mesh pass sieve, and then retained at 800° C. for 12 hours in an electric furnace. A temperature increasing rate from room temperature to 800° C. was set to 5° C./min and a temperature decreasing rate from 800° C. was set to 1° C./min.

Further, the resultant sintered body was pulverized through dry pulverization and wet pulverization until the sintered body achieved an average particle diameter $D_{50}$ of 1.0 μm, and then classified with a 350-mesh test sieve. Thus, Sample No. 7 was obtained.

Finally, the $Bi_2O_3$-based glass powder described above and Sample No. 7 were mixed at a volume ratio of 75:25. Thus, a sealing material was obtained. The resultant sealing material was fired at 500° C. to provide a dense fired body. After that, a measurement sample for TMA was produced by processing the fired body into a predetermined shape. TMA was performed in a temperature range of from 30'C to 300° C. through use of the measurement sample. The thermal expansion coefficient of Sample No. 7 was calculated based on the thermal expansion coefficient of the sealing material obtained. As a result, Sample No. 7 had a thermal expansion coefficient of $10 \times 10^{-7}/°$ C.

The invention claimed is:

1. A ceramic powder, in which β-eucryptite or a β-quartz solid solution is precipitated as a main crystal phase, in which $TiO_2$ and/or $ZrO_2$ is solid solved, and which has an average particle diameter $D_{50}$ of 7 μm or less,
   wherein the ceramic powder is substantially free of a glass phase.

2. The ceramic powder according to claim 1, wherein the ceramic powder comprises as a composition, in terms of mol %, 10% to 35% of $Li_2O$, 10% to 35% of $Al_2O_3$, 30% to 79.5% of $SiO_2$, and 0.005% to 5% of $TiO_2+ZrO_2$.

3. The ceramic powder according to claim 1, wherein the ceramic powder has a negative thermal expansion coefficient in a range of from 30° C. to 300° C.

4. A sealing material, comprising a glass powder and a ceramic powder,
   wherein the ceramic powder comprises the ceramic powder of claim 1.

5. A laser sealing comprising the sealing material according to claim 4.

6. A method of producing a ceramic powder, comprising the steps of:
   firing a raw material batch to obtain, through a solid phase reaction, a sintered body in which β-eucryptite or a β-quartz solid solution is precipitated as a main crystal phase, and which comprises $TiO_2$ and/or $ZrO_2$, and
   pulverizing the sintered body to obtain a ceramic powder, wherein the ceramic powder has an average particle diameter $D_{50}$ of 7 μm or less; and
   wherein the ceramic powder is substantially free of a glass phase.

7. The method of producing a ceramic powder according to claim 6, comprising using a pulverized product of a pre-sintered body containing Li, Al, and Si as a whole or part of introduction raw materials for Li, Al, and Si.

8. The method of producing a ceramic powder according to claim 6, comprising using any one of an oxide raw material, a hydroxide raw material, and a carbonate raw material as a whole or part of introduction raw materials for Li, Al, and Si.

9. The method of producing a ceramic powder according to claim 6, wherein the firing a raw material batch provides, through the solid phase reaction, a sintered body comprising as a composition, in terms of mol %, 10% to 35% of $Li_2O$, 10% to 35% of $Al_2O_3$, 30% to 79.5% of $SiO_2$, and 0.005% to 5% of $TiO_2+ZrO_2$.

10. The method of producing a ceramic powder according to claim 6, wherein the firing a raw material batch is performed at from 1,000° C. to 1,450° C.

11. The method of producing a ceramic powder according to claim 6, wherein the pulverizing the sintered body is performed so that the ceramic powder obtained in the step of the pulverizing the sintered body has a size smaller than a size of a precipitated crystal grain.

12. The method of producing a ceramic powder according to claim 6, wherein the pulverizing the sintered body is performed so that a grain boundary between precipitated crystal grains is substantially free of microcracks.

* * * * *